Figure 1:
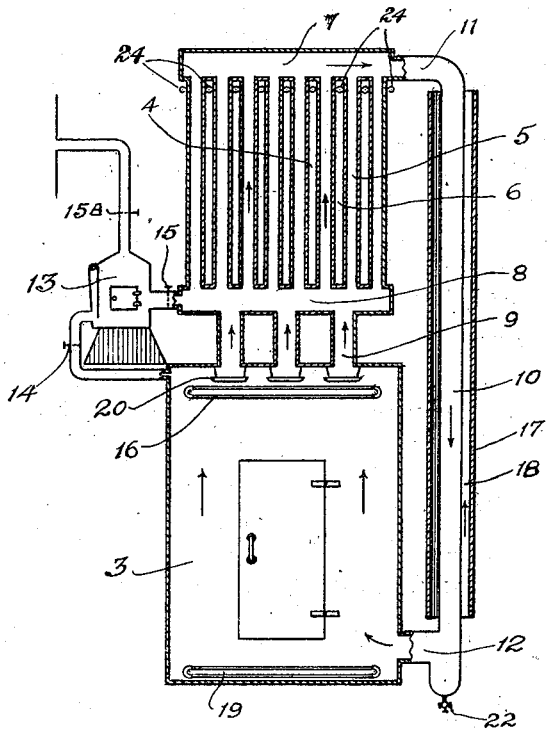

C. B. TRESCOTT.
APPARATUS FOR CURING FOOD PRODUCTS.
APPLICATION FILED JAN. 27, 1911.

1,010,327.

Patented Nov. 28, 1911.

Witnesses:
Ephraim Banning
Frances M. Frost

Inventor:
Charles B. Trescott
By Banning & Banning
Attorneys.

UNITED STATES PATENT OFFICE.

CHARLES B. TRESCOTT, OF SAN FRANCISCO, CALIFORNIA, ASSIGNOR TO HENRY L. MILLIS, OF CHICAGO, ILLINOIS.

APPARATUS FOR CURING FOOD PRODUCTS.

1,010,327.

Specification of Letters Patent. Patented Nov. 28, 1911.

Application filed January 27, 1911. Serial No. 604,990.

*To all whom it may concern:*

Be it known that I, CHARLES B. TRESCOTT, a citizen of the United States, residing at San Francisco, in the county of San Francisco and State of California, have invented certain new and useful Improvements in Apparatus for Curing Food-Products, of which the following is a specification.

This invention relates to a new and improved apparatus for curing food products, by means of what is known as a smoking process, and in which the products of the combustion of wood are brought into contact with the uncured meat to effect the changes therein which are known as curing.

It will be understood that the products of combustion, which are commonly known as smoke, consist of a mixture of various products, some of which have desirable curative qualities, and sooty or black particles, which consist largely of unburned carbon and give the smoke its distinctive appearance.

In carrying on my curing process, I make use of such products as creosote and carbon dioxid, which have the desirable curative qualities, and I reject the sooty or tarry black matter. I then make provision for controlling the temperature, humidity, draft, etc., of the curative products, in order to subject the meat to their action in the most advantageous manner.

In the smoke curing of meat, it will be understood that a certain amount of evaporation of its moisture takes place. This tends to reduce its volume and weight, producing what is known as shrinkage, and effecting, to some extent, a loss of such matter by shrinkage. In order to overcome this loss as much as possible, means should be provided for initially forming a dry skin or layer on the outer surface of the meat, which, while permitting the curative products to penetrate into the body of the meat, largely prevents the loss of moisture outwardly.

It will be understood that the success of a smoke curing process depends largely upon the exact temperature at which it is carried on. Also, that the proper temperature for one class of meat is different from that for another class; consequently, I provide means for accurately regulating and determining said temperature in order to carry on the process to the best advantage. An excess of temperature tends to cause unnecessary shrinkage and loss in the meat blocks, as well as tending to spoil their appearance and flavor. When the process is carried on at too low a temperature, it is unnecessarily slow and is not thorough.

In carrying on my curing process, by means of the apparatus of the present invention, I provide means for rejecting the sooty and black matter from the products of combustion, leaving only those products which have desirable curative qualities.

It will be understood that, as the curing process continues, a certain amount of moisture evaporation takes place, so that the curative products become humid. It is a well known fact that the cooling of humid gases tends to cause them to deposit their moisture. Therefore, I provide means for cooling said gases after they have passed over the blocks of meat, thereby precipitating the moisture on suitable surfaces, whence it can be carried away and rejected. It is found that, as the curative products themselves circulate over these moist surfaces, they deposit their sooty matter on said surfaces, so that the same is carried away with the moisture.

In order to secure the necessary precipitation of moisture for drying the curative products, they must have their temperature suddenly reduced on the condenser a sufficient number of degrees. This amount of cooling should preferably be not less than 10° F. In order to secure this necessary fall in temperature on the condenser, the curative products should sometimes strike the cooling surfaces at a temperature in excess of that desirable for carrying on the curing process in the curing chamber. This being the case, the curative products must be heated after they have passed over the meat but before they strike the cooling surfaces of the condenser. I therefore provide a heater in proper location to heat the curative products after they leave the meat and before they are cooled in the condenser. It will be understood that after the curative products have been cooled in the condenser to precipitate their moisture they are returned to the curing chamber, where they again encounter the meat. In case they should be cooled by the condenser to a temperature below that desirable for carrying on the curing process, they should be reheated before they strike the meat, and to this end an additional heater may be provided in suitable position for accomplishing this preliminary heating, although it will be understood that the functions of this heater are entirely different and distinct from those of the first mentioned heater.

I make use of the heater, which heats the curative products before they strike the condenser, for another purpose, to-wit: for aiding in the creation of the circulation of the curative products by natural draft. It is a well known fact that a column of cool gas tends to descend, while a warm column tends to ascend. I make use of this fact for the creation of the natural draft, by placing the condenser in the most advantageous position, namely, on the top of the curing chamber. I then provide a down draft flue which carries the cool gases from the condenser to the lower part of the curing chamber. In order to still further cool the gases in this down draft flue, when desired, I surround the same with a partition spaced away from the flue a proper distance to provide a passage for the upward movement of air, which serves to still further cool the gases in the down draft flue. It will be understood that the parts are so related that the effect of this down draft flue is to aid in the creation of the natural draft, so that even if no artificial means were provided a sufficient draft for properly carrying on the process will ordinarily exist.

In carrying on the curing process, it is desired to first create or form a dry skin on the outside of the meat. Such skin will largely prevent a further loss of moisture from the interior of the meat, although not preventing a proper penetration of the curative products. This dry skin can be quickly formed, by the provision of a comparatively rapid movement of air or gases during the initial stages of the process. After it has been formed, the rate of circulation should be reduced, and thereafter there should be only sufficient movement to bring up the new gases which have the curative properties, as fast as required. To this end I provide means for artificially controlling the rate of circulation, although it will be understood that said artificial means act in conjunction with and not in opposition to the natural draft.

Figure 2:
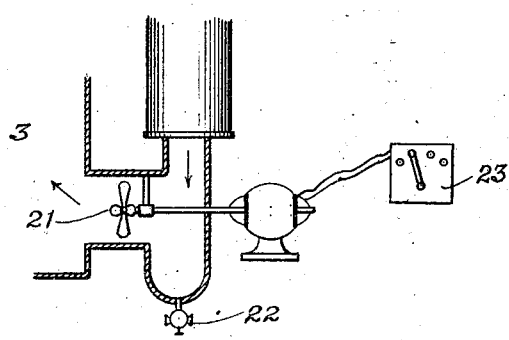

Referring now to the drawing, in Figure 1 I show a cross section through the apparatus, the smoke generator which initially forms the gases being shown in elevation, however; and in Fig. 2 I show more in detail the lower portion of the down draft flue, in conjunction with a fan which may be used for controlling the draft.

In the figures, the numeral 3 designates the curing chamber, in which the blocks of meat or other edibles are supported in any suitable manner. The numeral 4 designates the condenser. In the construction illustrated, the same comprises a series of vertical pipes or flues 5, separated by spaces 6, through which the cooling air may circulate. The pipes 5 are connected at their upper and lower ends by manifolds 7 and 8, respectively, the latter of which connects directly with the upper portion of the curing chamber by means of connections 9. A down draft flue 10 has its upper end 11 suitably connected to the manifold 7, and its lower end 12 suitably connected to the lower portion of the curing chamber. The generator 13 is connected in shunt with the pipes 9, and valves 14, 15, and 15ᴬ serve to control the supply of new curative products to the system.

The circulation of the curative products is shown by the arrows. After leaving the curing chamber, they pass through the condenser, where they have their moisture removed to a certain degree, and then they return through the down draft flue to the lower portion of the curing chamber, after which the cycle is repeated. In the construction illustrated, a heating coil 16 is properly located, to heat the products of combustion after they have passed over the meat blocks but before they enter the condenser.

It is seen that the natural movement of the curative products will be that shown, by reason of the location of the heating coil 16. However, in order to accelerate this movement and make use of the down draft flue to the best advantage, I surround the same with a shell 17, to provide a space 18 between the same and the down draft flue. Inasmuch as the latter is normally warmer than the outside atmosphere, there will exist a tendency for a movement of the cooling air upward in the space 18, as illustrated, thereby virtually converting the down draft flue into a counter-current cooler. As is well known, such a cooler is most efficient, and, consequently, the cooling of the gases in the flue will be most pronounced.

When desired, an auxiliary heater 19 may be used for controlling the temperature at which the curative products encounter the blocks of meat. It will be understood, however, that in general this auxiliary heater is not needed, and that its function is entirely different from that of the heater 16. The heater 16 serves to insure that the curative products shall strike the condenser at a sufficiently high temperature so that they will be reduced in temperature a sufficient amount to precipitate their moisture. This moisture will drip down onto the cooling surfaces and may be collected in a series of trays 20. As before stated, the soot and other tarry matter will be caught in the moisture on the surfaces so that they will be carried down into the trays 20, and, by connecting the latter to a suitable discharge, the moisture and soot may be carried away.

In the modified construction shown in Fig. 2, a fan 21 is provided for controlling the rate of circulation of the curative products. It will be understood that this fan acts in addition to the natural movement of the gases as created by the down draft flue instead of in opposition to such movement. Therefore, it is only necessary to use the fan to accelerate and control the rate of circulation, and often the use of the fan will be unnecessary.

A rheostat 23 may be provided for controlling the speed of the fan, thereby controlling the rate of circulation of the curative products in accordance with requirements. It will be understood that the natural draft is greatly affected by the temperatures which exist in the curing chamber and condensing chamber as well as outside of the apparatus; consequently such means for controlling the rate of circulation will permit the operator to obtain just that amount of circulation which is necessary or desirable at each stage of the curing process, regardless of the required temperatures within the curing and condensing chambers, as well as the temperature of the outside atmosphere. A pet cock 22 may be provided for carrying off any moisture which may collect in the down draft flue.

It will be understood that certain of the curative products are very volatile, so that, unless the apparatus in which this process is carried on be comparatively tight, these products will be wasted and the efficiency of the process correspondingly reduced. Furthermore, it will be understood that the arrangement of the parts is peculiarly adapted for the provision of a system in which the circulation of the products is effected by natural draft. This being the case, the apparatus should be tight enough to reduce the leakage to such a point that the natural drafts will be sufficient to produce proper circulation.

When desired, a stream of water or other volatile liquid may be allowed to trickle down the outside of the pipes 5 of the condenser, so that the cooling effect of the condenser will be increased by reason of the evaporation of said liquid and the consequent removal of the latent heat of evaporation.

I claim:

1. In an apparatus for curing food products, the combination of a curing chamber, a condensing chamber connected therewith, means for generating curative products in shunt with the connection between the curing chamber and the condensing chamber, and a return connection from the condensing chamber to the curing chamber, with a heater suitably interposed in the path of circulation of curative products between the curing chamber and the condensing chamber, substantially as described.

2. In an apparatus for curing food products, the combination of a curing chamber, a condensing chamber connected therewith, a down draft connection from the upper portion of the condensing chamber to the lower portion of the curing chamber, and a heater suitably interposed in the path of circulation of curative products between the curing chamber and the condensing chamber, with means for generating curative products in shunt between the upper portion of the curing chamber and the lower portion of the condensing chamber, substantially as described.

3. In an apparatus for curing food products, the combination of a curing chamber, a condensing chamber, superimposed on the same and directly connected therewith, and a return connection from the condensing chamber to the curing chamber, with a heater suitably interposed in the path of movement of curative products between the curing chamber and the condensing chambers, to heat the curative products immediately in advance of their contact with the condensing surfaces, and means for controlling the rate of movement of the curative products through the apparatus, substantially as described.

4. In an apparatus for curing food products, the combination of a curing chamber, a condensing chamber superimposed on the same and connected therewith, and a down draft connection from the upper portion of the condensing chamber to the lower portion of the curing chamber, with a heater suitably interposed in the path of movement of the curative products between the curing chamber and the condensing chamber, and artificial means for controlling the rate of movement of the curative products through the apparatus, and comprising a fan or the like, acting in a direction to accelerate said movement, substantially as described.

5. In an apparatus for curing food products, the combination of a curing chamber, a condensing chamber connected therewith, means for generating curative products in shunt with the connection between the curing chamber and the condensing chamber, and a return connection from the condensing chamber to the curing chamber, with a heater suitably interposed in the path of movement of the curative products between the curing chamber and the condensing chamber, and a second heater suitably interposed in the path of movement of the curative products, to raise their effective temperature in the curing chamber to the desired degree, substantially as described.

6. In an apparatus for curing food products, the combination of a curing chamber, a condensing chamber superimposed on the same and connected therewith, and a down draft connection extending from the upper portion of the condensing chamber to the lower portion of the curing chamber, and means for effecting a difference of temperature between curative products in the upper and lower portions of said down draft connection, substantially as described.

7. In an apparatus for curing food products, the combination of a curing chamber, a condensing chamber superimposed on the same and connected therewith, and a down draft connection from the upper portion of the condensing chamber to the lower portion of the curing chamber, with a heater suitably interposed in the path of movement of the curative products between the curing chamber and the condensing chamber, and means for effecting a difference of temperature between the curative products in the upper and lower portions of said down draft connection, substantially as described.

8. In an apparatus for curing food products, the combination of a curing chamber, a condensing chamber superimposed on the same and connected therewith, and a down draft connection from the upper portion of the condensing chamber to the lower portion of the curing chamber, and artificial means for controlling the rate of circulation of the curative products through the apparatus, comprising a fan or the like, and means, as a rheostat, for controlling the speed of said fan, substantially as described.

9. In an apparatus for curing food products, the combination of a curing chamber, a condensing chamber connected therewith, a down draft connection from the upper portion of the condensing chamber to the lower portion of the curing chamber, and a heater suitably interposed in the path of circulation of curative products to bring the temperature within the curing chamber to the desired point, with means for generating curative products in shunt between the upper portion of the curing chamber and the lower portion of the condensing chamber, substantially as described.

10. In an apparatus for curing food products, the combination of a curing chamber, a condensing chamber superimposed on the same and connected therewith, and a return connection from the condensing chamber downwardly to the curing chamber, with a heater interposed in the path of movement of curative products and situated between the curing chamber and the condensing chamber to heat the curative products in their upward movement after they leave the food products and before they strike the cooling surfaces of the condensing chamber, whereby the temperature of the curative products is raised above that of the cooling surfaces without increasing the temperature of the curative products at the point where they strike the food products, substantially as described.

CHARLES B. TRESCOTT.

Witnesses:
 THOMAS A. BANNING, Jr.,
 MARY R. FROST.